United States Patent
Messer et al.

(10) Patent No.: US 11,726,282 B2
(45) Date of Patent: Aug. 15, 2023

(54) FIBER-OPTIC CABLE AND METHOD OF MANUFACTURE

(71) Applicant: Carlisle Interconnect Technologies, Inc., St. Augustine, FL (US)

(72) Inventors: Mark Messer, St. Johns, FL (US); Jack Edger Sutherland, Everett, WA (US)

(73) Assignee: Carlisle Interconnect Technologies, Inc., St. Augustine, FL (US)

( * ) Notice: Subject to any disclaimer, the term of this patent is extended or adjusted under 35 U.S.C. 154(b) by 0 days.

(21) Appl. No.: 16/785,214

(22) Filed: Feb. 7, 2020

(65) Prior Publication Data

US 2020/0174210 A1 Jun. 4, 2020

Related U.S. Application Data

(63) Continuation of application No. 15/180,437, filed on Jun. 13, 2016, now Pat. No. 10,558,006.

(51) Int. Cl.
*G02B 6/44* (2006.01)

(52) U.S. Cl.
CPC ......... *G02B 6/4436* (2013.01); *G02B 6/4402* (2013.01); *G02B 6/4433* (2013.01)

(58) Field of Classification Search
CPC ....................................................... G02B 6/44
USPC ....................................................... 385/102
See application file for complete search history.

(56) References Cited

U.S. PATENT DOCUMENTS

| | | | | |
|---|---|---|---|---|
| 4,441,787 A * | 4/1984 | Lichtenberger | ...... | G02B 6/4402 385/107 |
| 5,002,359 A * | 3/1991 | Sayegh | .................. | G02B 6/443 385/107 |
| 5,293,442 A * | 3/1994 | Sayegh | ................ | G02B 6/4402 385/102 |
| 7,792,405 B2 * | 9/2010 | Stoesz | ................ | G02B 6/02209 385/100 |
| 8,355,613 B2 * | 1/2013 | Weimann | ............. | G02B 6/4433 385/100 |
| 9,244,237 B2 * | 1/2016 | Mehan | .................. | G02B 6/4486 |
| 9,442,264 B1 * | 9/2016 | Cheatle | .................. | G02B 6/443 |
| 2002/0170877 A1 * | 11/2002 | Fazio | .................. | C03C 25/6293 216/24 |
| 2003/0118296 A1 * | 6/2003 | Smith | .................. | G02B 6/4432 385/102 |
| 2006/0228080 A1 * | 10/2006 | Letch | .................... | G02B 6/4436 385/113 |
| 2008/0279514 A1 * | 11/2008 | Kundis | ................ | G02B 6/4433 385/113 |

(Continued)

OTHER PUBLICATIONS

European Patent Office; Search Report and Written Opinion in related International Patent Application No. PCT/US2017/037001 dated Aug. 31, 2017; 12 pages.

*Primary Examiner* — Kaveh C Kianni
(74) *Attorney, Agent, or Firm* — Wood Herron & Evans LLP (57) ABSTRACT

A fiber optic cable includes an optical fiber element including a core and cladding layer. A strength member layer is positioned over the optical fiber element and includes a layer of fiber elements composed of at least 25% high temperature fiber material. An outer jacket layer is positioned over the strength member layer and is formed of a highly flame-resistant material.

15 Claims, 2 Drawing Sheets

(56) References Cited

U.S. PATENT DOCUMENTS

| | | | |
|---|---|---|---|
| 2010/0092135 A1* | 4/2010 | Barker | G02B 6/4471 385/76 |
| 2010/0158457 A1* | 6/2010 | Drozd | G02B 6/4432 385/113 |
| 2010/0254668 A1* | 10/2010 | Consonni | C08L 23/0869 385/102 |
| 2012/0099825 A1* | 4/2012 | Messer | G02B 6/4436 385/113 |
| 2012/0222487 A1* | 9/2012 | Hill | G01H 9/004 73/655 |
| 2012/0257863 A1* | 10/2012 | O'Riorden | G02B 6/443 385/109 |
| 2013/0051745 A1* | 2/2013 | Weimann | G02B 6/4436 385/112 |
| 2014/0029903 A1* | 1/2014 | Blazer | G02B 6/4432 385/102 |
| 2015/0131952 A1* | 5/2015 | Gallo | G02B 6/4436 385/102 |

* cited by examiner

FIBER-OPTIC CABLE AND METHOD OF MANUFACTURE

CROSS-REFERENCE TO RELATED APPLICATIONS

This application is a Continuation of U.S. patent application Ser. No. 15/180,437, filed Jun. 13, 2016 (pending), the disclosure of which is incorporated by reference herein.

FIELD OF THE INVENTION

The present invention relates generally to fiber-optic cables, and more specifically, to a fiber-optic cable having improved physical and performance characteristics for withstanding flammability issues.

BACKGROUND OF THE INVENTION

Fiber-optic cables are used in a wide variety of applications today to replace traditional copper cables. Such fiber-optic cables, for example, may be utilized to transmit data and control signals between computers and processors. Optical fiber provides reliable data transfer, with exceptional speed and bandwidth. The small size and the light weight of fiber-optic cables make them particularly useful in communication applications, which have significant space and weight restrictions.

Fiber-optic cables receive significant use in the aerospace industry for both commercial and military applications. In such usage, the fiber-optic cables must have a very robust construction because even minor failures in a cable may have significant and undesirable consequences. Generally, in traditional aerospace usage, the construction of a fiber-optic cable includes a glass strand, or fiber, and a cladding layer and buffer layer. One or more buffer layers are utilized on the outside of the glass strand for physically supporting and buffering the fragile glass strand. Furthermore, since fiber-optic cables are often subjected to extremes in temperature, pressure, vibration and shock, additional layers, such as strength member layers and jackets or jacket layers, are utilized on the outside of the buffer.

Fiber-optic cables also might utilize fibers made of plastic or polymer, referred to as plastic/polymer optical fibers (POF). Generally, such POF fibers are made of polymethyl methacrylate (PMMA) for the optical core. The POF fiber then might be coated with a thin coating of a material, such as a fluorinated polymer, as a cladding layer. The POF cable may also have other buffer layers over the fiber and cladding layer. Generally, such traditional POF fibers are not suitable for use in aerospace cables with their current constructions. Aerospace cables are subjected to significant mechanical, fluid, environmental, thermal, and other stresses, and so require a robust construction. Furthermore, the FAA requires that wire and cables utilized in aerospace applications pass a flammability test referred to as the FAA Flammability Test per Appendix F, part I of 14 CFR part 25 for wire and cable. Therefore, while typical POF fiber cables have been found suitable for automotive, electronic, and household uses, the current products will not meet tougher aerospace requirements. Furthermore, even if the POF fiber elements are constructed with typical aerospace components, because of the materials and construction of the actual POF fiber, they still will not pass the noted flammability test.

Fiber-optic cables made using POF fibers as the core are flammable since PMMA is a highly-flammable material. Even enhanced POF fiber cable construction, using outer layers that have some inherent flame resistance and with typical strength members like aramid and glass yarn materials surrounding the fiber elements, does not solve some of the issues presented by POF cables, due to the flammability of the core material. The resulting cables still fails a FAA flammability test because the strength members burn away, exposing the highly-flammable inner components that will continue to burn and/or allow flaming droplets to drip out of the construction that is not protected by the strength member.

Fiber-optic cables used for aerospace applications are typically manufactured with materials in each layer that help protect the cable. Along with the flammability requirement, the fiber-optic cable is exposed to temperature extremes of +100 to −55 degrees C. or more. Furthermore, such cables are exposed to hydraulic fluids, jet fuels, cleaning solvents, runway deicers and other corrosive fluids.

Also, in fiber cables that incorporate both glass and POF constructions/core elements, it is desirable to use layer materials that are flammable due to the greater flexibility of the material, the lower cost, and ease of the manufacturing processes. To try and address some of the issues noted herein with different buffer layer materials that have some flame resistance makes the cables more costly, less flexible and with a greater tendency to shrink.

Furthermore, the materials used that can address the harsh exposure of such aerospace cables still are not assured to pass the FAA flammability test. As noted, Plastic Optical Fiber (POF) uses polymethyl methacrylate, known as PMMA, for the optical core. The high flammability of the material prevents it from passing the FAA flammability test when tested alone, and even when it is surrounded or jacketed with inherently flame-resistant materials. Even adding strength member layers as commonly used in aerospace cables, such as para-aramid yarns and common fiberglass (e.g., E-glass), does not allow the finished product to pass the FAA flammability test.

It is therefore an objective of the invention to improve generally upon existing fiber-optic cable technology and to provide a fiber-optic cable with a robust construction for aerospace uses. It is further an objective to provide a POF cable that is able to be used in aerospace applications. It is still further an objective to provide a cable that is able to withstand flammability requirements, including the FAA flammability test.

These features and other features of the invention will become more readily apparent from the Detailed Description and drawings of the application.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention.

SUMMARY OF THE INVENTION

A fiber optic cable includes an optical fiber element including a core and cladding layer on the core. A primary buffer layer and/or one or more inner jacket layers may be positioned over the optical fiber. A strength member layer is positioned over the optical fiber element and any intermediate layers. The strength member layer includes a layer of fiber elements composed of at least 25% high temperature fiber material. An outer jacket layer is positioned over the strength member layer. The outer jacket layer is formed of a highly flame-resistant material. In one embodiment of the invention, the flame-resistant material of the outer jacket layer is formed of material having a Limiting Oxygen Index of equal to or greater than 30.

DETAILED DESCRIPTION OF THE INVENTION

The fiber-optic cable constructed in accordance with the aspects of the present invention significantly improves the durability of fiber-optic cables used in aerospace applications. It particularly improves the robustness of POF cable for use in aerospace applications. More specifically, the invention provides a fiber optic cable, using either glass core elements or plastic/polymer core elements, that is able to withstand specific flammability requirements while still meeting other requirements for aerospace fiber-optic cable. All of these various benefits are achieved as noted, without a degradation of the optical, mechanical or thermal performance of the cable. Accordingly, the present invention presents significant improvements to the state of the art of fiber-optic cables, and particularly to the state of the art of fiber-optic cables used in aerospace and other applications.

The present invention specifically provides improved flammability performance for various different constructions of fiber-optic cables, including POF and glass fibers. Specifically, it presents a fiber-optic cable construction with the ability to withstand a standard aerospace FAA flammability test, such as the FAA Flammability Test, as defined below. Furthermore, the present invention may also be useful for passing other different performance and flammability requirements.

FAA Flammability Test Definition:

Sixty degree test. A minimum of three specimens of each wire specification (make and size) must be tested. The specimen of wire or cable (including insulation) must be placed at an angle of 60° with the horizontal in the draft free cabinet in accordance with Federal Test Method Standard 191 Model 5903 with the cabinet door open during the test, or must be placed within a chamber approximately 2 feet high by 1 foot by 1 foot, open at the top and at one vertical side (front), and which allows sufficient flow of air for complete combustion, but which is free from drafts. The specimen must be parallel to and approximately 6 inches from the front of the chamber. The lower end of the specimen must be held rigidly clamped. The upper end of the specimen must pass over a pulley or rod and must have an appropriate weight attached to it so that the specimen is held tautly throughout the flammability test. The test specimen span between lower clamp and upper pulley or rod must be 24 inches and must be marked 8 inches from the lower end to indicate the central point for flame application. A flame from a Bunsen or Tirrill burner must be applied for 30 seconds at the test mark. The burner must be mounted underneath the test mark on the specimen, perpendicular to the specimen and at an angle of 30 deg. to the vertical plane of the specimen. The burner must have a nominal bore of ⅜-inch and be adjusted to provide a 3-inch high flame with an inner cone approximately one-third of the flame height. The minimum temperature of the hottest portion of the flame, as measured with a calibrated thermocouple pyrometer, may not be less than 1750 deg. F. The burner must be positioned so that the hottest portion of the flame is applied to the test mark on the wire. Flame time, burn length, and flaming time of drippings, if any, must be recorded. The burn length is determined in accordance with the parameters defined below and must be measured to the nearest tenth of an inch. Breaking of the fiber specimens is not considered a failure.

Burn Length.

Burn length is the distance from the original edge to the farthest evidence of damage to the test specimen due to flame impingement, including areas of partial or complete consumption, charring, or embrittlement, but not including areas sooted, stained, warped, or discolored, nor areas where material has shrunk or melted away from the heat source.

Test:

The hottest portion of the flame is held to the sample for 30 seconds and then withdrawn.

Post 30 Second Flame Application Requirements:

1. The sample self-extinguishes
   a. The flame must extinguish in 30 seconds.
   b. Average burn length must be equal to or less than 3 inches.
2. Flaming droplets must self-extinguish within an average of not more than 3 seconds. Some flammability tests require that flaming droplets also do not ignite a tissue paper installed under the test sample, and the invention addresses that standard as well. Some flammability tests require the fiber to self-extinguish in 5 seconds and the invention addresses that standard as well.

Figure 1:
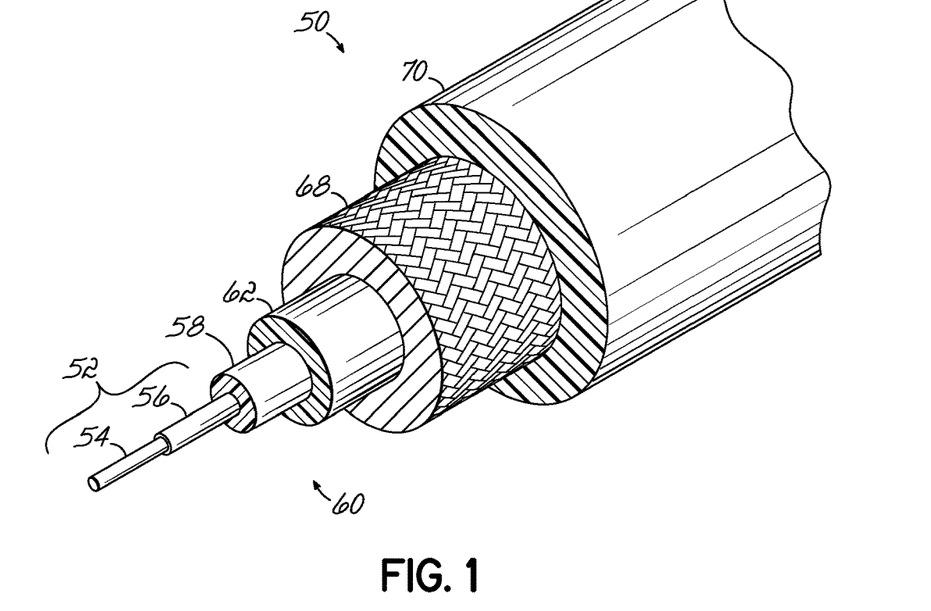
FIG. 1 is a perspective cross-sectional view of a fiber-optic cable in accordance with one embodiment of the invention.
Figure 2:
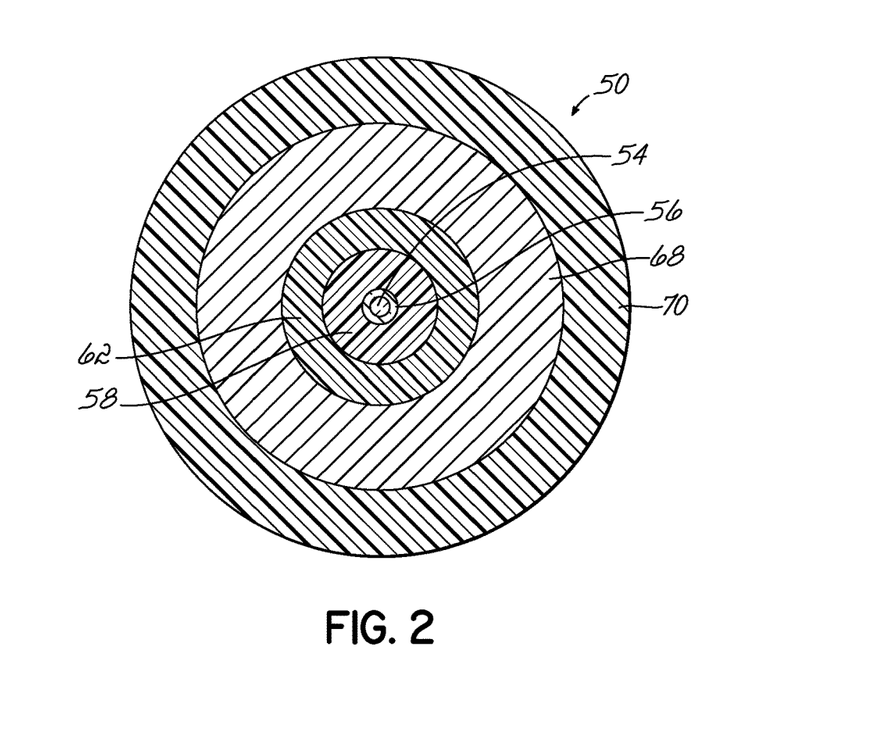
FIG. 2 is a cross-sectional view of the cable in FIG. 1.

Turning now to FIGS. 1-2, one embodiment of the invention is illustrated for descriptive purposes. The Figures illustrate a cable with multiple layers in accordance with aspects of the invention and illustrate relative locations of various layers or layer elements as discussed herein. However, the layer thicknesses, as illustrated, are not specific or precise in the Figures, and are merely for illustrative purposes in showing the location of the various layer elements in relation to the other layer elements and the construction of the entire cable. The invention is not limited by such illustrations, which are shown for the purpose of description only.

Specifically, cable 50 is a fiber-optic cable that incorporates at least one optical fiber element or fiber 52 for transmitting light signals that is surrounded and protected by additional layers or layer elements in accordance with features of the invention. Each respective layer circumferentially surrounds the optical fiber element along its length, and may surround one or more of the previous inner layers. The optical fiber element 52 is generally coaxially located within cable 50, as shown. The optical fiber element 52 generally includes a fiber core element or core 54 and a cladding layer 56 on the core. The core 54 is made of a light transmitting material, such as glass, a plastic or polymer or plastic-clad material, and a suitable cladding layer 56 around the core acts as a waveguide to keep the light reflected within the core to transmit light signals along the length of the fiber element.

The present invention is directed to improving the performance characteristics of a fiber-optic cable, such as for use in harsh environments, including aerospace environments. In one aspect, the invention improves the flammability characteristics of POF (plastic optical fiber/polymer optical fiber) cables since the core and any cladding layers and other surrounding layers of such cables are made of flammable materials. The invention also has applicability with glass core fiber as well, as described herein.

Generally, one or more intermediate layers are used to protect the core. For example, an inner layer or primary buffer layer 58 surrounds the fiber element 52. Such a fiber structure for use in the inventive cable will generally be commercially available and include a core and cladding and a primary buffer layer, although just a core/cladding optical fiber element without an inner or buffer layer is also commercially available.

There are a number of existing fiber elements or fibers in the market today that include single mode, multi-mode and step index fibers to name the most popular. The common element in these fibers is that they have a core where the light signal is transmitted, a cladding over the core that keeps the light reflected within the core and an outer coating layer or buffer layer that provides protection during handling or serves a specific function such as water resistance or radiation resistance, for example. For glass fibers, one particular example is a 62.5/125/250 multimode fiber, which is a common fiber that has a core diameter of 62.5 µm, a cladding diameter of 125 µm, and an acrylate coating diameter of 250 µm.

For a POF fiber element, the core element may be Polymethyl methacrylate (PMMA), which is common for POF fiber elements used in fiber optic cables. Alternatively, the POF core might also be formed of a fluorinated polymer and other materials. The POF fiber element may have a diameter of 980 µm, for example.

The cladding for the POF fiber element as used in embodiments of the invention might be a suitable fluorinated polymer (fluoropolymer), with the cladding layer of the POF core having a thickness of 10 µm, for example. A primary buffer layer 58 may include a cross-linked polyethylene, a fluorinated polymer or other similar material. Suitable POF optical fiber elements for use in the invention are available from Asahi Kasei of Tokyo, Japan or Mitsubishi Rayon Co. LTD of Tokyo, Japan.

For a glass optical fiber element, the core is glass as is the cladding and they cooperate for the transmission of optical signals. Generally, the outer coating, or primary buffer layer 58, is positioned to surround the glass fiber element 52. The coating may be an acrylate, polyimide or silicone. For example, an acrylate available from Corning of Corning, N.Y., might be suitable. Other possible coatings include Silicone coating from Corning, or an acrylate coating material available from Fiberlogix of Warren, N.J.; Verillon of North Grafton, Mass.; J-Fiber of Juna, Germany; and Nufern of East Granby, Conn. might be utilized. In addition to acrylates and other materials as noted above, a polyimide coating might be utilized, and is available from OFS of Norcross, Ga.; Polymicro Technologies of Phoenix, Ariz.; Nufern; and Verillon. Additionally, some ceramic coatings or hybrid glass might also be suitable for implementing the coating layer 66 of the present invention. The coating might have a thickness of around 62.5 µm, for example. Various coated fibers are commercially available, as noted below, and the invention is not limited to a particular fiber or coated fiber. Some suitable fibers for the invention include:

| Fiber Types | Primary Buffer/Coating Layer Used | Vendors |
| --- | --- | --- |
| Multimode | Acrylate | Corning, Hickory, NC |
| SingleMode | Acrylate | Corning, Hickory, NC |
| Multimode | Polyimide | OFS, Norcross, GA; Verillon, North Grafton, MA; Nufern, East Granby, CT; Fiberlogix, Warren, NJ |
| SingleMode | Polyimide | OFS, Norcross, GA; Verillon, North Grafton, MA; Nufern, East Granby, CT; Fiberlogix, Warren, NJ |
| Multimode | High Temperature Acrylate-HTA | Fiberlogix, Warren, NJ; Verillon, North Grafton, MA; J-Fiber, Juna, Germany; Nufern, East Granby, CT |
| Step Index | Cross-linked Polyethylene | Mitsubishi Rayon Co. LTD Tokyo, Japan |
| Step Index | Fluorinated Polymer | Asahi Kasei, Tokyo, Japan |
| Graded Index | Fluorinated Polymer | Asahi Kasei, Tokyo, Japan |

In some embodiments of the invention, a secondary buffer layer or inner jacket layer 62 is formed and positioned over the primary buffer or coating layer and under a strength member 68 and outer jacket 70, as described herein. The nomenclature for such a layer 62 may vary and while layer 62 for a glass fiber element might be referred to as a "secondary buffer", for a POF element, the layer 62 is sometimes also referred to as an "inner jacket" layer. For consistency herein, the layer 62 will be referred to as an inner jacket layer, although it may serve the purpose of being a secondary buffer in some cable designs. The actual designation names of the layers are not meant to be limiting to the invention.

The inner jacket layer 62 is formed to overlay the primary or first buffer/coating layer 58 and to act together with that primary buffer layer 58 to buffer or protect the optical fiber element 52. In accordance with one embodiment of the invention, the inner jacket layer might be a continuous material layer positioned over the primary buffer layer. The inner jacket layer 62 may have a thickness in the range of 0.001-0.020 inches, for example.

In accordance with one aspect of the invention, fiber-optic cable 50 incorporates a strength member layer 68 within the construction that is capable of providing not only strength and protection for the cable but also for ensuring that it is suitable for harsh aerospace and other environments and also capable of passing desirable flammability tests. Accordingly, in one embodiment, the strength member layer includes fiber elements composed of at least 25% high temperature fiber material. The remaining fiber elements of the strength member layer may incorporate other fibers or filaments of different materials that may provide other desirable characteristics, such as strength characteristics, for example elements may be chosen for the ability to reduce the cable's stretch and creep, for impact resistance, for longitudinal or tensile strength, for increased flexibility, for increased flex life, for tighter bend radius and for cost reduction. The unique construction of the inventive cable provides an enhanced fiber-optic cable designed to withstand harsh flame environments, and particularly able to withstand the FAA flammability test, as discussed herein. To that end, the unique construction prevents the fiber-optic cable from severing during the thirty seconds of the flame application for the FAA flammability test, and also causes the core material to self-extinguish within the time limit, and prevents a portion of the cable from dripping out of the cable in the form of flaming droplets. Furthermore, the construction keeps the burnt distance along the cable below the three-inch maximum limit.

The present invention provides the ability to utilize a fiber-optic cable having a plastic or polymer core, referred to as POF cable, or a glass optical fiber with similarly flammable buffer layer material, within the harsh environment encountered within aerospace applications. Such a fiber optic cable can also be used in other applications, but provides significant advantages in the harsh environment of aerospace applications and the flammability requirements therein.

For the purposes of the description of the invention, the term "high temperature" will refer to those strength member fiber/filament materials having a softening point or other rated operating temperature that exceeds 950° C. Preferably, in accordance with one feature of the invention, such a softening point or rated operating temperature exceeds 985° C. The softening point might be determined by the Standard test and method associated with the softening point of glass as set forth in ASTM C338-93 (2003). For some other high temperature materials suitable for use in the invention, such as quartz glass and ceramic fibers that do not have a per se softening point, the rated operating temperature might be the temperature at which the material maintains its integrity. Referring to the Figures, the strength member layer 68 is composed of hundreds of individual filaments of the desirable high temperature material having a filament diameter in a range of 5 μm-21 μm. Multiple filaments are brought together to form a "yarn", with each yarn considered an "end" in the construction of the strength member layer. Strength member layer 68 may be formed in a number of ways to surround the fiber element 52 and other layers (e.g., 58, 62). In one embodiment, layer 68 is formed by the yarns of fibers/filaments being pulled in parallel to the axis of the cable to generally circumferentially surround the optical fiber element 52, and other layers thereunder, such as a primary buffer layer 58, and an inner jacket layer 62. In another embodiment, strength member layer 68 also might be formed by yarns that are served or braided, as illustrated in the drawings, to form the strength member layer 68 that circumferentially surrounds the optical fiber element 52 and other layers. Herein, the term "fiber" or "filament", as related to strength member layer 68, is utilized to refer to the fiber material and individual filament elements that make up the high temperature fiber strength member layer 68 (as opposed to an optical fiber). Such terms are not limiting in way, with respect to the invention.

The strength member layer 68 cooperates with an outer jacket layer 70 positioned over the strength member layer 68 to provide flammability resistance, and to make existing fiber-optic cable constructions, such as those that utilize plastic or polymer cores (POF), able to pass desirable flammability tests, and particularly, an FAA flammability test.

In accordance with one aspect of the invention, while the strength member layer, including a layer of fiber elements composed of at least 25% high temperature fiber material, might be braided or pulled in parallel, a braided construction may be preferred because it consistently surrounds the optical fiber core with a strength member, even when the cable is bent.

In accordance with one embodiment of the invention, the high temperature fiber material utilized for the strength member layer 68 includes S-glass fibers that have a softening point of around 1,056° C. A suitable S-glass fiber material is G75 S-2 Glass available from AGY of Aiken, S.C.

In accordance with another embodiment of the invention, the high temperature fiber material utilized in the strength member layer 68 of the invention may incorporate a quartz glass fiber or quartz/silica fiber having a rated operating temperature at which it maintains its integrity that is in the range of 1,050° C.-1,250° C. One suitable Quartz glass fiber material is Quartzel available from St Gobain of Malvern, Pa.

In accordance with still another embodiment of the invention, the high temperature fiber material utilized in the strength member layer 68 of the invention may incorporate ceramic fiber having a rated operating temperature above 1,000° C. One suitable ceramic fiber material is Hiltex ALF 80/20 available from Hiltex of West Knollendam, The Netherlands.

In accordance with another embodiment of the invention, the high temperature fiber material utilized in the strength member layer 68 of the invention may incorporate R-glass fiber having a softening point of around 952° C.

While it may be desirable to utilize a strength member layer 68 that is constructed using 100% high temperature fiber material using some of the materials disclosed herein for the purposes of the invention, other fiber material may be used in a blend in the strength member layer to provide other properties to the cable, such as high strength properties, chemical durability properties, low electrical conductivity properties, stiffness properties, or other desirable properties in addition to the high temperature resistance provided by the strength member layer. As such, for a strength member layer that has a construction with fiber elements composed of at least 25% high temperature fiber material, the remaining percentage for the strength member layer might be made up of other high strength fiber elements, as noted herein.

For example, in addition to traditional E-glass fiber elements blended in with the high temperature fiber material of the invention, Boron-free E-glass might be utilized, as well as D-glass. Additional materials might incorporate a meta-aramid fiber, such as Nomex, available from DuPont, or a para-aramid fiber, such as Kevlar, also available from DuPont. Accordingly, the strength member layer of the invention may utilize a hybrid construction, as long as at least 25% of the fiber elements are high temperature fiber material, as disclosed herein. That is, the strength member layer 68 may be formed of woven fibers that include both high temperature fibers as disclosed that are woven in with other fibers. For example, Aramid fibers, such as Kevlar might be woven in with suitable glass Quartz fibers.

To form the strength member, for example, 10 to 14 glass yarn ends might be woven along with from 2 to 6 aramid yarn ends for a combined total of 16 yarn ends in the woven braid. In some particular embodiments of the invention, as discussed herein, 4 Aramid yarn ends and 12 Quartz glass yarn ends are woven in a 16 yarn end woven braid, according to known techniques. A suitable weave angle might be 8-9 picks per inch, and suitable braiding equipment, might be utilized.

The density of the high temperature fiber material used in the strength member layer may be adjusted above 25%, depending upon the selection of certain other layer members, such as the outer jacket layer, the inner jacket layer, and/or the composition of the optical fiber element core and cladding layer as disclosed herein.

In accordance with one aspect of the invention, the strength member layer of high temperature fiber material may be constructed to have a thickness in the range of approximately 0.001 inches-0.030 inches. The construction and thickness of the high temperature fiber material layer will depend on the overall construction of the cable, as well as the thicknesses of other layers utilized in the material selected therein.

In accordance with another aspect of the invention, an outer jacket layer 70 made of highly flame resistant materials operates in conjunction with the high temperature fiber strength member layer 68 to provide the desirable flammability properties, and the ability to pass the FAA flammability test. In accordance with the invention, the outer jacket layer incorporates highly flame resistant materials having a Limiting Oxygen Index (LOI) that is equal to or greater than 30. In one embodiment of the invention, the LOI is equal to or greater than 90, such as with the use of various fluoropolymers. The outer jacket layer of highly flame resistant materials with an LOI within the noted LOI range is positioned over the strength member layer. In one embodiment of the invention, the layer 70 is formed of a highly flame-resistant material selected from the following group of materials of List 1:

List 1: Flame-Resistant Jacket Materials Having an LOI≥30:
  Fluoropolymer (e.g. Ethylene tetrafluoroethylene (ETFE),
  Fluorinated ethylene propylene (FEP), Polytetrafluoroethylene (PTFE)
    Ethylene Chlorotrifluoroethylene (ECTFE))
    Perfluoroalkoxy alkane (PFA)
    Polyaryletherketone (PAEB)
    Polybutylene terephthalate (PBT)
    Polyether Ether Ketone (PEEK)
    Polyvinylidene Fluoride (PVDF)
    Polyimide (PI)
    Silicone The outer jacket is appropriately formed onto the cable 50, such as by being extruded thereon. The outer jacket layer may be formed with a thickness in the range of approximately 0.004 inches-0.025 inches. In accordance with one feature of the invention, the high temperature strength member layer 68, including the high temperature fiber material, protects the core material of the optical fiber element from leaking out and causing flaming droplets and/or causing the flame on the cable to not extinguish within the time limit of the FAA flammability test. In accordance with another feature of the invention, the high temperature strength member layer 68 also prevents the burnt area of the cable from exceeding the three-inch maximum requirement.

As noted, outer jacket 70 is formed of a highly flame-resistant material with an LOI greater than or equal to 30. A fluoropolymer material might be utilized to form outer jacket layer 70, for example (see List 1). Conventional thermoplastic extrusion processes might be utilized to apply the outer jacket. Furthermore, coating processes might also be utilized for forming the outer jacket 70. In addition to extrusion and coating, wrapped tapes might be utilized to form the outer jacket. The wrapped tapes, such as polyimide and PTFE tapes might be wrapped and then sintered, according to appropriate jacketing specifications. In one particular embodiment of the invention, the outer jacket is formed of a single layer of extruded PFA material, such as PFA available under the trademark Neoflon™ from Daikin America, Inc. of Orangeburg, N.Y. or the registered trademark Teflon® PFA from DuPont. As noted, the outer jacket may have a thickness, for example, in the range of 0.004 inches to 0.025 inches.

The outer jacket layer formed of a highly flame-resistant material works in conjunction and in combination with the strength member to hold the cable together and extinguish any flame after a thirty-second exposure time. The combination of implementing a strength member layer that includes a layer of fiber elements composed of at least 25% high temperature fiber material, in conjunction with the flame-resistant outer jacket layer, allows the multiple layers to uniquely cooperate together in a fiber-optic cable. With a POF fiber-optic cable, as well as a glass fiber cable, not only is a flame extinguished so that the cable is able to self-extinguish within the time limit, but also, flaming droplets are prevented from leaking out of the core of the optical fiber element. Furthermore, the combination of layers keeps the burnt distance along the cable below the three-inch maximum limit.

While existing cable designs might be modified by simply increasing the thickness of the outer jacket layer until it is so thick that it might pass the flammability requirements, the resulting cable and the increase in the weight and diameter of that cable, would make it unusable for aerospace applications, where weight and space limitations are critical. As such, the invention provides a unique solution to that noted problem, and provides a fiber-optic cable that is useful for aerospace applications, and can withstand the harsh conditions of such applications, as well as being able to meet flammability requirements associated with the FAA flammability test, while still being of a size and weight that is practical for aerospace use.

Figure 3:
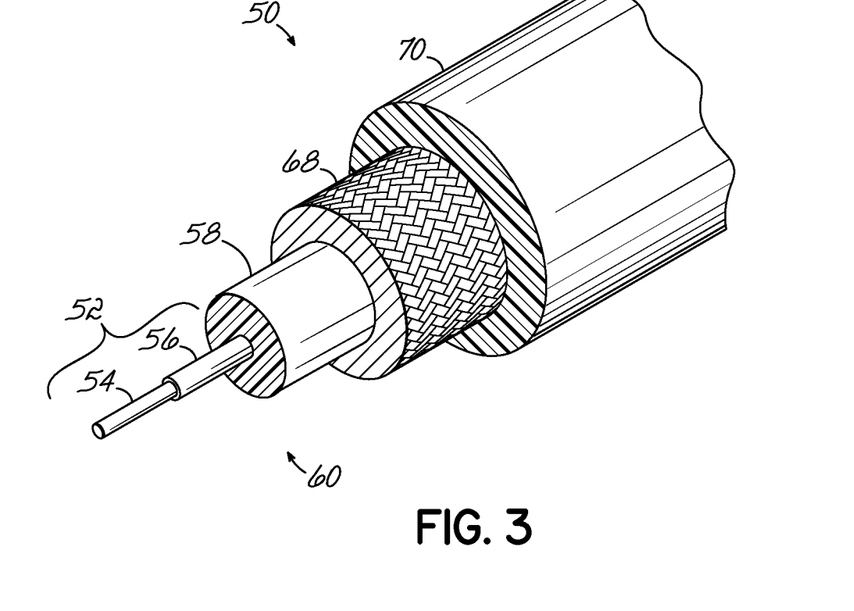
FIG. 3 is a perspective cross-sectional view of a fiber-optic cable, in accordance with an alternative embodiment of the invention
Figure 4:
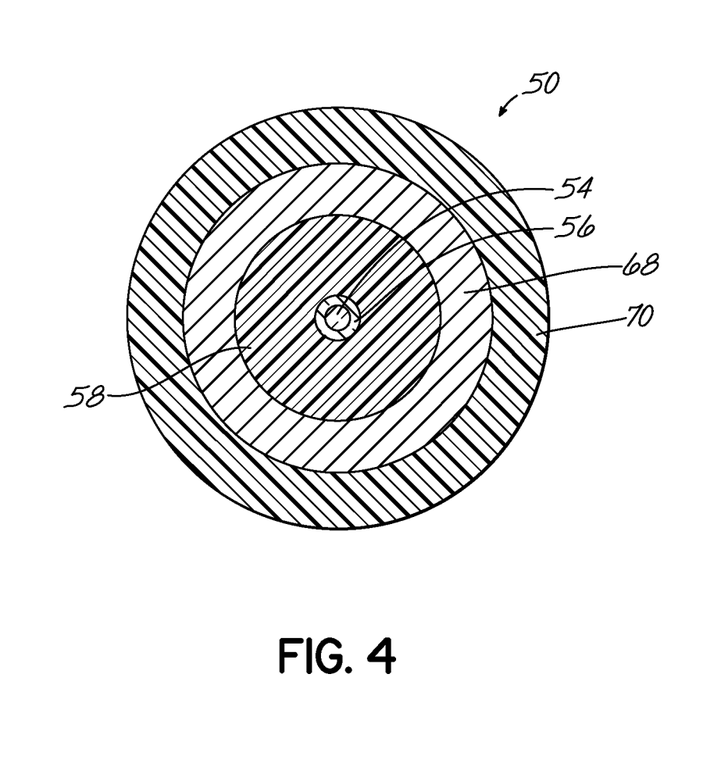
FIG. 4 is a cross-sectional view of the cable in FIG. 3.

In accordance with another aspect of the invention, an inner jacket layer 58 may be utilized and positioned over any primary buffer layer, and beneath or under the strength member layer. As illustrated in FIGS. 1 and 2, the inner jacket layer 62 is shown. However, the invention is not limited to having an inner jacket layer. Referring to FIGS. 3 and 4, the construction of the inventive cable 50 is shown, wherein the inner jacket layer 62 is not utilized.

The unique construction of the current fiber optic cable allows the inner jacket layer 62 or any other layers beneath the strength member layer and outer jacket to be formed of a variety of different materials, while still meeting flammability requirements as noted herein. In accordance with one aspect of the invention, the inner jacket layer may be formed of a highly flame-resistant material, similar to the outer jacket layer, such as materials as set forth in List 1 above. As such, the inner jacket layer would work in cooperation with both the outer jacket layer 70 and the strength member layer 68, in accordance with the invention, to provide the improved flammability characteristics that are desired. The inner jacket might be applied in a variety of ways, such as by being extruded over the optical fiber element 52, for example.

In accordance with another aspect of the invention, the unique construction of the invention allows a fiber-optic cable to be formed with a core or inner jacket layer or some other layer using a number of elements that are not highly flame-resistant, like those elements set forth as suitable for the outer jacket layer and set forth in List 1. For example, inner jacket layer might be formed of materials that might have some slight flame retardant qualities but still have an LOI rating that is below 30. To that end, the materials set forth below in List 2 might be utilized to form the inner jacket layer 62 or some other inner layer or component of the cable construction. When used in combination with the inventive combination of the disclosed strength member layer and the outer jacket layer set forth herein, the cable construction would still provide the desired flammability characteristics sought as well as other desirable characteristics for an aerospace fiber-optic cable. That is, the present invention, utilizing a strength member layer of at least 25% high temperature fiber material in combination with an outer jacket layer of a highly flame-resistant material, would still provide the desired properties and features noted herein, even when the cable design had one or more inner layers or inner jacket layers using materials that may be flammable.

List 2: List of Other Potential Jacket/Layer Materials Having an LOI<30:

Flame-Retardant Thermoplastic copolyester (FR-TPC)
Flame-Retardant Thermoplastic polyester elastomer (FR-PCT-ET) (Hytrel®)
Crosslinked Polyvinylchloride (XLPVC)
Crosslinked polyethylene (XL-PE)
Flame Retardant Polyamide (FR-PA)
Flame-Retardant Polyvinylchloride (FR-PVC)
Flame Retardant Polyethylene (FR-PE)
Flame Retardant Polypropylene (FR-PP)
Flame Retardant Polyurethane (FR-PU)
Flame Retardant Thermoplastic elastomer (FR-TPE)
Flame-Retardant Thermoplastic Rubber (FR-TPR)
Thermoplastic copolyester (TPC)
Thermoplastic polyester elastomer (PCT-ET) (Hytrel®)
Polyurethane (PU)
Polypropylene (PP)
Polyethylene (PE)
Polyvinylchloride (PVC)
Thermoplastic elastomer (TPE)
Thermoplastic Rubber (TPR)
Polymethyl methacrylate (PMMA)
Polyamide (PA)

Various different examples of cables constructed in accordance with the aspects of the invention may have applicability as fiber optic cables for use in a variety of different applications, including aerospace applications.

Example 1

Core/Cladding: PMMA/Fluoropolymer
Primary Buffer: cross-linked polyolefin
Inner Jacket layer: 0.006 inch thick wall of FEP
Strength Member layer: Braided layer with 4 ends of aramid fiber (approximately 25% of strength member) and 12 ends of Quartz glass
Outer jacket layer: 0.008 inch thick wall of FEP Example 2

Core/Cladding: PMMA/Fluoropolymer
Primary Buffer: cross-linked polyolefin
Inner Jacket layer: 0.006 inch thick wall of any material in List 1:
Strength Member layer: Braided layer with 4 ends of aramid fiber (approximately 25% of strength member) and 12 ends of Quartz glass
Outer jacket layer: 0.008 inch thick wall of thick wall of any material in List 1.

Example 3

Example of invention using inner jacket materials from List 2 and outer jacket from List 1
Core/Cladding: PMMA/Fluoropolymer
Primary Buffer: cross-linked polyolefin
Inner Jacket layer: 0.006 inch thick wall of Hytrel® (PCT-ET)
Strength Member layer: Braided layer with 8 ends of aramid fiber (approximately 50% of strength member) and 8 ends of Quartz glass
Outer jacket layer: 0.008 inch thick wall of FEP or any material in List 1

Example 4

Example of invention using an inner jacket from List 2 and an outer jacket from List 1
Core/Cladding: PMMA/Fluoropolymer
Primary Buffer: cross-linked polyolefin
Inner Jacket layer: 0.006 inch thick wall of any material from List 2 or List 3
Strength Member layer: Braided layer with 4 ends of aramid fiber (approximately 25% of strength member) and 12 ends of Quartz glass
Outer jacket layer: 0.008 inch thick wall of FEP or any material from List 1

Example 5

Glass Optical Fiber core/cladding: 62.5/125 multimode glass
Primary Buffer: Acrylate (250 um diameter)
Secondary Buffer/Inner Jacket layer: Hytrel® or material from List 2
Strength Member layer: Braided layer with 4 ends of aramid fiber (approximately 25% of strength member) and 12 ends of Quartz glass
Outer jacket: 0.008 inch thick wall of FEP or any material from List 1

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:
1. A fiber optic cable comprising:
at least one optical fiber element including a glass core and cladding layer on the core;
a primary buffer layer positioned over the at least one optical fiber element;
an inner jacket layer positioned over the primary buffer layer;
a strength member layer surrounding the inner jacket layer, the primary buffer layer and the at least one optical fiber element, the strength member layer including a plurality of yarns of fiber material positioned together to circumferentially surround the inner jacket layer, primary buffer layer and at least one optical fiber element to form the strength member layer;

at least one of the yarns of the fiber material of the strength member being formed of a high temperature fiber material having at least one of a softening point exceeding 950° C. or a rated operating temperature exceeding 950° C. and at least one of the yarns of the fiber material including aramid fibers, and the strength member layer including a combination of the high temperature fiber material and aramid fibers with the composition of the strength member layer including at least 25% high temperature fiber material with respect to the remaining fiber material of the overall strength member layer;

an outer jacket layer positioned over the strength member layer, the outer jacket layer being formed of a highly flame-resistant material.

2. The fiber optic cable of claim 1 wherein the highly flame resistant material of claim 1 has a Limiting Oxygen Index (LOI) of equal to or greater than 30.

3. The fiber optic cable of claim 1 wherein the inner jacket layer is formed of a highly flame-resistant material.

4. The fiber optic cable of claim 1 wherein the high temperature fiber material of the strength member layer includes fibers of at least one of: S-glass fibers, R-glass fibers, Ceramic fibers and Quartz Silica fibers.

5. The fiber optic cable of claim 1 wherein the highly flame-resistant material of the outer jacket layer includes at least one of: Ethylene tetrafluoroethylene ETFE, Fluorinated ethylene propylene FEP, Perfluoroalkoxy alkane PFA, Polytetrafluoroethylene PTFE, Ethylene Chlorotrifluoroethylene (ECTFE), Polyaryletherketone (PAEB), Polybutylene terephthalate (PBT), Polyether Ether Ketone (PEEK), Polyvinylidene Fluoride (PVDF), Polyimide (PI) or Silicone.

6. The fiber optic cable of claim 1 wherein the strength member layer has a thickness in the range of 0.001-0.030 inches.

7. The fiber optic cable of claim 1 wherein the outer jacket layer has a thickness in the range of 0.004-0.025 inches.

8. The fiber optic cable of claim 1 wherein the inner jacket layer is formed of a material of at least one of: Flame-Retardant Thermoplastic copolyester (FR-TPC), Flame-Retardant Thermoplastic polyester elastomer (FR-PCT-ET) (Hytrel®), Crosslinked Polyvinylchloride (XLPVC), Crosslinked polyethylene (XL-PE), Flame Retardant Polyamide (FR-PA), Flame-Retardant Polyvinylchloride (FR-PVC), Flame Retardant Polyethylene (FR-PE), Flame Retardant Polypropylene (FR-PP), Flame Retardant Polyurethane (FR-PU), Flame Retardant Thermoplastic elastomer (FR-TPE), Flame-Retardant Thermoplastic Rubber (FR-TPR), thermoplastic copolyester (TPC), Thermoplastic polyester elastomer (PCT-ET) (Hytrel®), Polyurethane (PU), Polypropylene (PP), Polyethylene (PE), Polyvinylchloride (PVC), Thermoplastic elastomer (TPE), Thermoplastic Rubber (TPR), Polymethyl methacrylate (PMMA), Polyamide (PA).

9. A fiber optic cable comprising:

at least one optical fiber element including a polymer core and a cladding layer on the core, the polymer core being formed of a material of Polymethyl methacrylate (PMMA) or a fluorinated polymer;

a primary buffer layer positioned over the optical fiber element;

a strength member layer surrounding the primary buffer layer, the strength member layer including a layer with a plurality of yarns of fiber material with at least one of the yarns formed of a high temperature fiber material;

the strength member layer including at least 25% high temperature fiber material with respect to the remaining fiber material of the overall strength member layer;

an outer jacket layer positioned over the strength member layer, the outer jacket layer being formed of a highly flame-resistant material having a Limiting Oxygen Index (LOI) of equal to or greater than 30.

10. The fiber optic cable of claim 9 further comprising an inner jacket layer positioned over the primary buffer layer and under the strength member layer.

11. The fiber optic cable of claim 10 wherein the inner jacket layer is formed of a material of at least one of: Flame-Retardant Thermoplastic copolyester (FR-TPC), Flame-Retardant Thermoplastic polyester elastomer (FR-PCT-ET) (Hytrel®), Crosslinked Polyvinylchloride (XLPVC), Crosslinked polyethylene (XL-PE), Flame Retardant Polyamide (FR-PA), Flame-Retardant Polyvinylchloride (FR-PVC), Flame Retardant Polyethylene (FR-PE), Flame Retardant Polypropylene (FR-PP), Flame Retardant Polyurethane (FR-PU), Flame Retardant Thermoplastic elastomer (FR-TPE), Flame-Retardant Thermoplastic Rubber (FR-TPR), thermoplastic copolyester (TPC), Thermoplastic polyester elastomer (PCT-ET) (Hytrel®), Polyurethane (PU), Polypropylene (PP), Polyethylene (PE), Polyvinylchloride (PVC), Thermoplastic elastomer (TPE), Thermoplastic Rubber (TPR), Polymethyl methacrylate (PMMA), Polyamide (PA).

12. The fiber optic cable of claim 9 wherein the strength member layer includes high temperature fiber material having at least one of a softening point or a rated operating temperature exceeding 950° C.

13. The fiber optic cable of claim 9 wherein the high temperature fiber material of the strength member layer includes fibers of at least one of: S-glass fibers, R-glass fibers, Ceramic fibers and Quartz Silica fibers.

14. The fiber optic cable of claim 13 wherein the highly flame-resistant material of the outer jacket layer includes at least one of: Ethylene tetrafluoroethylene ETFE, Fluorinated ethylene propylene FEP, Perfluoroalkoxy alkane PFA, Polytetrafluoroethylene PTFE, Ethylene Chlorotrifluoroethylene (ECTFE), Polyaryletherketone (PAEB), Polybutylene terephthalate (PBT), Polyether Ether Ketone (PEEK), Polyvinylidene Fluoride (PVDF), Polyimide (PI) or Silicone.

15. The fiber optic cable of claim 9 wherein the highly flame-resistant material of the outer jacket layer includes at least one of: Ethylene tetrafluoroethylene ETFE, Fluorinated ethylene propylene FEP, Perfluoroalkoxy alkane PFA, Polytetrafluoroethylene PTFE, Ethylene Chlorotrifluoroethylene (ECTFE), Polyaryletherketone (PAEB), Polybutylene terephthalate (PBT), Polyether Ether Ketone (PEEK), Polyvinylidene Fluoride (PVDF), Polyimide (PI) or Silicone.

* * * * *